United States Patent
Park et al.

(10) Patent No.: US 11,099,669 B2
(45) Date of Patent: Aug. 24, 2021

(54) CONDUCTIVE STRUCTURE, METHOD OF MANUFACTURING THE SAME, TOUCH SENSOR INCLUDING THE CONDUCTIVE STRUCTURE, METHOD OF MANUFACTURING THE TOUCH SENSOR, AND TOUCH SENSING METHOD

(71) Applicant: IUCF-HYU (INDUSTRY-UNIVERSITY COOPERATION FOUNDATION HANYANG UNIVERSITY), Seoul (KR)

(72) Inventors: Wanjun Park, Seoul (KR); Sungwoo Chun, Gimpo-si (KR)

(73) Assignee: IUCF-HYU (INDUSTRY-UNIVERSITY COOPERATION FOUNDATION HANYANG UNIVERSITY), Seoul (KR)

(*) Notice: Subject to any disclaimer, the term of this patent is extended or adjusted under 35 U.S.C. 154(b) by 4 days.

(21) Appl. No.: 16/214,976

(22) Filed: Dec. 10, 2018

(65) Prior Publication Data
US 2019/0113996 A1    Apr. 18, 2019

Related U.S. Application Data

(63) Continuation of application No. PCT/KR2017/005980, filed on Jun. 9, 2017.

(30) Foreign Application Priority Data

Jun. 10, 2016  (KR) .................. 10-2016-0072134

(51) Int. Cl.
*G06F 3/041*   (2006.01)
*G01L 1/14*    (2006.01)

(52) U.S. Cl.
CPC .............. *G06F 3/041* (2013.01); *G01L 1/146* (2013.01); *G06F 2203/04102* (2013.01); *G06F 2203/04103* (2013.01)

(58) Field of Classification Search
CPC ........ G06F 3/041; G06F 3/044; G06F 3/0412; G06F 3/0416; G01L 1/146
(Continued)

(56) References Cited

U.S. PATENT DOCUMENTS 10,564,755 B2 * 2/2020 Shi .................. H01L 51/0097
10,620,755 B2 * 4/2020 Park .................. G06F 3/0443
(Continued)

FOREIGN PATENT DOCUMENTS

JP   2009-151783 A   7/2009
KR   10-2012-0000667 A   1/2012
(Continued)

OTHER PUBLICATIONS

Flexible graphene tactile sensor with pressure broadening structure on polyimide substrate, 2014, 91 pages.
(Continued)

*Primary Examiner* — Calvin C Ma
(74) *Attorney, Agent, or Firm* — Sughrue Mion, PLLC (57) ABSTRACT

A conductive structure is provided. The conductive structure includes a template including a skeleton and a pore therein and having flexibility, and a conductive material aggregated and formed on the skeleton and in the pore.

14 Claims, 10 Drawing Sheets
(3 of 10 Drawing Sheet(s) Filed in Color)

(58) Field of Classification Search
USPC .................................................. 345/173, 174
See application file for complete search history.

(56) References Cited

U.S. PATENT DOCUMENTS

2013/0020117 A1*  1/2013  Yamato .................. C08J 7/0427
                                                    174/258
2016/0130502 A1*  5/2016  Hatsusaka .......... C09K 19/2021
                                                    349/106
2016/0215217 A1*  7/2016  Akiyama ........... C09K 19/2021

FOREIGN PATENT DOCUMENTS

| KR | 10-2012-0049679 A | 5/2012 |
| KR | 10-2013-0124822 A | 11/2013 |
| KR | 10-2015-0019707 A | 2/2015 |
| KR | 10-2015-0080373 A | 7/2015 |
| KR | 10-2015-0133875 A | 12/2015 |

OTHER PUBLICATIONS

Sungwoo Chun et al., "A tactile sensor using a conductive graphene-sponge composite", Nanoscale, Mar. 30, 2016, pp. 9185-9192, vol. 8.
International Search Report for PCT/KR2017/005980 dated Sep. 27, 2017 [PCT/ISA/210].

* cited by examiner

CONDUCTIVE STRUCTURE, METHOD OF MANUFACTURING THE SAME, TOUCH SENSOR INCLUDING THE CONDUCTIVE STRUCTURE, METHOD OF MANUFACTURING THE TOUCH SENSOR, AND TOUCH SENSING METHOD

CROSS-REFERENCE TO RELATED APPLICATION

This application is a continuation of pending International Application No. PCT/KR2017/005980, which was filed on Jun. 9, 2017 and claims priority to Korean Patent Application No. 10-2016-0072134, filed on Jun. 10, 2016, in the Korean Intellectual Property Office, the disclosures of which are hereby incorporated by reference in their entireties.

BACKGROUND

1. Field

The present disclosure relates to a conductive structure, a touch sensor including the conductive structure, and manufacturing methods thereof, and more particularly, to a conductive structure in which a conductive material is aggregated and formed in a pore and on a skeleton of a template, a touch sensor including the conductive structure, and manufacturing methods thereof.

2. Description of the Related Art

The development of devices based on a touch becomes an important issue due to the rapid development of mobile devices and efforts to imitate a human touch. A touch sensor and a wearable electronic device ever invented have been developed to sense a touch. In particular, a material used in the touch sensor is based on ITO disposed on a silicon or glass substrate. The touch sensor using the ITO material is not flexible, and thus there is a limit to apply the touch sensor using the ITO material to a wearable device and a curved display device.

Thus, touch sensors using new materials (e.g., a nanowire, a carbon nanotube, and graphene) are being developed. For example, Korean Patent Publication No. 10-2013-0091493 (Application No. 10-2012-0012817) discloses a graphene touch panel that has an excellent warpage characteristic, a low manufacture cost and a large area by using an organic insulator and a graphene pattern layer patterned using a polymer stamp and an organic solvent, and a method of manufacturing the same.

However, these graphene touch sensors have low sensitivities and sense only whether or not an object touches the sensor. In other words, the graphene touch sensors do not sense a texture of the object. Thus, it is required to research and develop a touch sensor that can have excellent sensitivity and flexibility and can sense a surface characteristic (a texture) of an object.

SUMMARY

The present disclosure may provide a conductive structure with high conductivity, a touch sensor including the conductive structure, manufacturing methods thereof, and a touch sensing method.

The present disclosure may also provide a conductive structure with high restoring force, a touch sensor including the conductive structure, manufacturing methods thereof, and a touch sensing method.

The present disclosure may further provide a conductive structure capable of being simply manufactured, a touch sensor including the conductive structure, manufacturing methods thereof, and a touch sensing method.

The present disclosure may further provide a conductive structure with high flexibility, a touch sensor including the conductive structure, manufacturing methods thereof, and a touch sensing method.

The present disclosure may further provide a touch sensor including a conductive structure capable of sensing a surface roughness of an object to be touched, a method of manufacturing the same, and a touch sensing method.

In an aspect, a conductive structure may include a template including a skeleton and a pore therein and having flexibility, and a conductive material aggregated and formed on the skeleton and in the pore.

In an embodiment, the conductive material may be formed of graphene flakes.

In an embodiment, the template may be sponge.

In an aspect, a method of manufacturing a conductive structure may include providing a template which includes a skeleton and a pore therein and has flexibility, and immersing the template in a conductive material dispersion solution to aggregate and form a conductive material on the skeleton and in the pore.

In an embodiment, the conductive material may be formed of graphene flakes.

In an embodiment, the immersing of the template may be repeatedly performed.

In an aspect, a touch sensor may include a conductive structure including a flexible template having a skeleton and a pore therein and a conductive material aggregated and formed on the skeleton and in the pore, the conductive structure configured to be deformed by touch of an object, a first substrate, and a first electrode provided between the first substrate and the conductive structure.

In an embodiment, the touch sensor may further include a second substrate provided on a surface of the conductive structure opposite to the first substrate, and a second electrode provided between the second substrate and the conductive structure.

In an embodiment, when the object is touched through the first substrate, a conductivity of the conductive structure may increase.

In an embodiment, the conductivity of the conductive structure may be sensed through the first electrode.

In an embodiment, the conductive structure may be deformed by the touch of the object in such a way that a thickness of the conductive structure is reduced.

In an embodiment, when the touch of the object is removed, the deformation of the conductive structure may be restored by flexibility of the conductive structure.

In an embodiment, the touch sensor may further include a sensing substrate on a surface of the first substrate, to which the object is touched. The sensing substrate may include a sensing pattern.

In an embodiment, the conductive material may be formed of at least one of graphene flakes, a nano material, or a two-dimensional material, and the template may be formed of sponge.

In an aspect, a touch sensing method may include touching an object to the touch sensor including the conductive structure described above to deform the conductive structure, and sensing a change in conductivity according to the deformation of the conductive structure to sense touch or a surface roughness of the object.

In an aspect, a method of manufacturing a touch sensor may include immersing a template, which has flexibility and includes a skeleton and a pore therein, in a conductive material dispersion solution to aggregate a conductive material on the skeleton and in the pore, thereby forming a conductive structure, and forming an electrode, which is configured to sense deformation of the conductive structure by touch of an object, on at least one of a top surface or a bottom surface of the conductive structure.

In an embodiment, the method may further include forming a sensing pattern for sensing a surface roughness of the object on the top surface of the conductive structure.

In an embodiment, the conductive material may be formed of at least one of graphene flakes, a nano material, or a two-dimensional material, and the template may be formed of sponge.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE EMBODIMENTS

The inventive concepts will now be described more fully hereinafter with reference to the accompanying drawings, in which exemplary embodiments of the inventive concepts are shown. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts.

It will be understood that when an element such as a layer, region or substrate is referred to as being "on" another element, it can be directly on the other element or intervening elements may be present. In addition, in the drawings, the thicknesses of layers and regions are exaggerated for clarity.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concepts explained and illustrated herein include their complementary counterparts. As used herein, the term "and/or" includes any and all combinations of one or more of the associated listed items.

The terminology used herein is for the purpose of describing particular embodiments only and is not intended to limit the invention. As used herein, the singular terms "a", "an" and "the" are intended to include the plural forms as well, unless the context clearly indicates otherwise. It will be further understood that the terms "comprises", "comprising", "includes", "including", "have", "has" and/or "having" when used herein, specify the presence of stated features, integers, steps, operations, elements, and/or components, but do not preclude the presence or addition of one or more other features, integers, steps, operations, elements, components, and/or groups thereof. Furthermore, it will be understood that when an element is referred to as being "connected" or "coupled" to another element, it may be directly connected or coupled to the other element or intervening elements may be present.

In addition, in explanation of the present invention, the descriptions to the elements and functions of related arts may be omitted if they obscure the subjects of the inventive concepts.

Furthermore, "a touch sensor" used herein may sense whether or not an object touches the sensor, a touch intensity of an object, and a touch speed of an object and may sense a surface characteristic (a texture) of an object. As used herein, the term "touch" means that an object directly touches a sensor and/or that an object indirectly touches a sensor.

Figure 1:
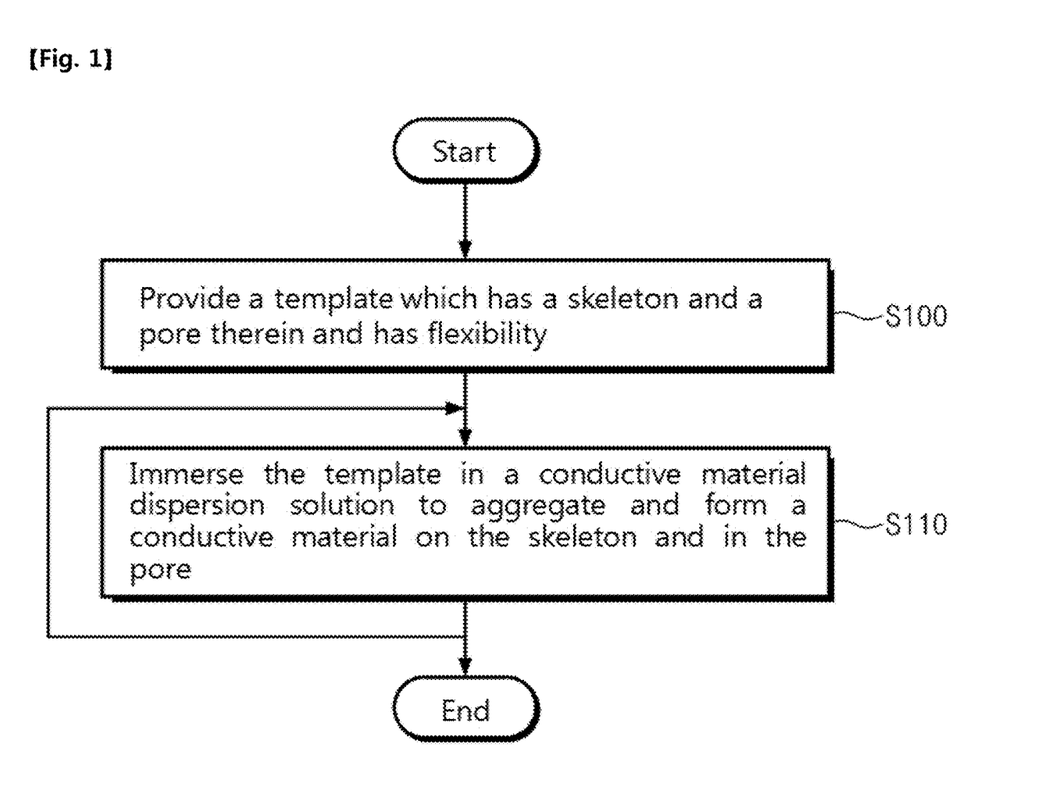
FIG. 1 is a flowchart illustrating a method of manufacturing a conductive structure according to an embodiment of the inventive concepts.

FIG. 1 is a flowchart illustrating a method of manufacturing a conductive structure according to an embodiment of the inventive concepts.

Referring to FIG. 1, a method of manufacturing a conductive structure according to an embodiment of the inventive concepts may include at least one of a first operation S100 of providing a template which has a skeleton and a pore therein and has flexibility, and a second operation S110 of immersing the template in a conductive material dispersion solution to aggregate and form a conductive material on the skeleton and in the pore. Hereinafter, each of the operations will be described in detail.

In the operation S100, the template which has the skeleton and the pore therein and has the flexibility may be provided.

The skeleton and the pore in the template may provide a structural space in which the conductive material may be formed.

In addition, the template may have the flexibility. Since the template has the flexibility, the template may be structurally deformed depending on a touch pressure of an object. For example, the template may be thinned depending on the touch pressure of the object. In addition, when the touch pressure of the object applied to the template is removed, the template may be structurally restored. Thus, the template may provide excellent response characteristics to repetitive touch pressure.

For example, the template may be formed of sponge, e.g., sponge formed of polyurethane. Hereinafter, the template formed of the sponge will be described as an example for the purpose of ease and convenience in explanation.

In the operation S110, the template may be immersed in the conductive material dispersion solution to aggregate and form the conductive material on the skeleton and in the pore.

For example, the conductive material may include at least one of a graphene flake, a nano material, or a two-dimensional material. For example, the nano material may include at least one of a carbon nanotube, a nanowire, or a nanofiber. The two-dimensional material may include at least one of molybdenum disulfide ($MoS_2$) or tungsten disulfide ($WS_2$). In certain embodiments, the conductive material may include at least one of polyvinylidene fluoride (PVDF) or ZnO. Hereinafter, the conductive material which is the graphene flake will be described as an example for the purpose of ease and convenience in explanation. However, embodiments of the inventive concepts are not limited to the graphene flake.

To form a graphene flake dispersion solution, first, the graphene flakes may be synthesized. Graphite may be sonicated or ball-milled to form the graphene flakes having small sizes (e.g., a single-atomic size).

The graphene flake dispersion solution may be formed using the formed graphene flakes. A method of forming the graphene flake dispersion solution may include mixing the graphene flakes with a solvent. For example, the solvent may be water or a di methyl formamide (DMF) solution. The graphene flakes may be mixed with the DMF solvent. For example, the amount of the graphene flakes per milliliter of the DMF solvent may range from 0.125 mg to 2.0 mg.

To improve a degree of dispersion of the formed graphene flake dispersion solution, a sonication process may be performed on the graphene flake dispersion solution for about 3 hours, and then, the graphene flake dispersion solution may be treated using a magnetic bar at 400 rpm for 1 hour. Thus, a homogeneous graphene flake dispersion solution may be obtained.

The template prepared in the operation S100 may be immersed in the formed graphene flake dispersion solution. For example, the template may be dip-coated with the graphene flake dispersion solution and then may be dried at about 170 degrees Celsius in a baking oven. When the template is dip-coated with the graphene flake dispersion solution, the graphene flakes may be formed on the skeleton of the template and in the pore of the template. In particular, the graphene flakes may be formed to have a great surface area in the pore as well as on the skeleton of the template by aggregation of the graphene flakes.

This dip-coating process may be repeatedly performed. For example, the dip-coating process may be performed 30 times.

A conductive structure which includes the template including the skeleton and the pore therein and having the flexibility and the conductive material aggregated and formed on the skeleton and in the pore may be manufactured by the method of manufacturing a conductive structure according to the aforementioned embodiment of the inventive concepts. Thus, electrical conductivity may be increased by the contact between the graphene flakes which occurs by touch of an object. As a result, the conductive structure according to an embodiment of the inventive concepts may be used in a pressure-sensitive touch sensor.

In particular, the conductive structure according to an embodiment of the inventive concepts may be manufactured by a simple method and may use both characteristics of the template and characteristics of the graphene flakes. For example, the conductive structure may sense repetitive touch inputs by high restoring force provided by the flexibility of the template according to an embodiment of the inventive concepts. In addition, the conductive structure may provide high sensitivity by the great surface area of the graphene flakes.

If a template is immersed in a graphene oxide dispersion solution to form a conductive structure like a conventional art, a separate process for reducing graphene oxide is additionally required. In addition, even though graphene oxide is reduced, complete reduction is not achieved. Generally, about 70% of graphene oxide may be reduced but about 30% of graphene oxide may not be reduced. Thus, it may be difficult to generate a conductive structure with high conductivity by the method of reducing graphene oxide. In addition, according to a conventional art, graphene oxide may not be properly aggregated, and thus graphene oxide may not be formed in a pore of the template. In this case, even though touch of an object occurs, a contact path between graphenes may be generated on only a skeleton of the template, and thus a touch sensor may not have high sensitivity.

However, in the conductive structure and the method of manufacturing the same according to the aforementioned embodiments of the inventive concepts, the graphene flakes may be formed directly in the template, and thus the conductive structure may be obtained without an additional process such as a reducing process. As a result, the processes may be simplified. In addition, the graphene flakes may be formed on the skeleton and in the pore of the template by using aggregating force of the graphene flakes. Thus, since a surface contact area between the graphene flakes is increased by touch of an object, a touch sensor with high conductivity and high sensitivity may be provided. Furthermore, since the graphene flakes are formed in the aggregated shape in the template, the graphene flakes may contribute to restoration of the shape of the template.

The method of manufacturing a conductive structure according to the embodiment of the inventive concepts and the conductive structure manufactured thereby were described above with reference to FIG. 1. Hereinafter, a conductive structure manufactured according to an embodiment of the inventive concepts will be described with reference to FIGS. 2 and 3.

Figure 2:
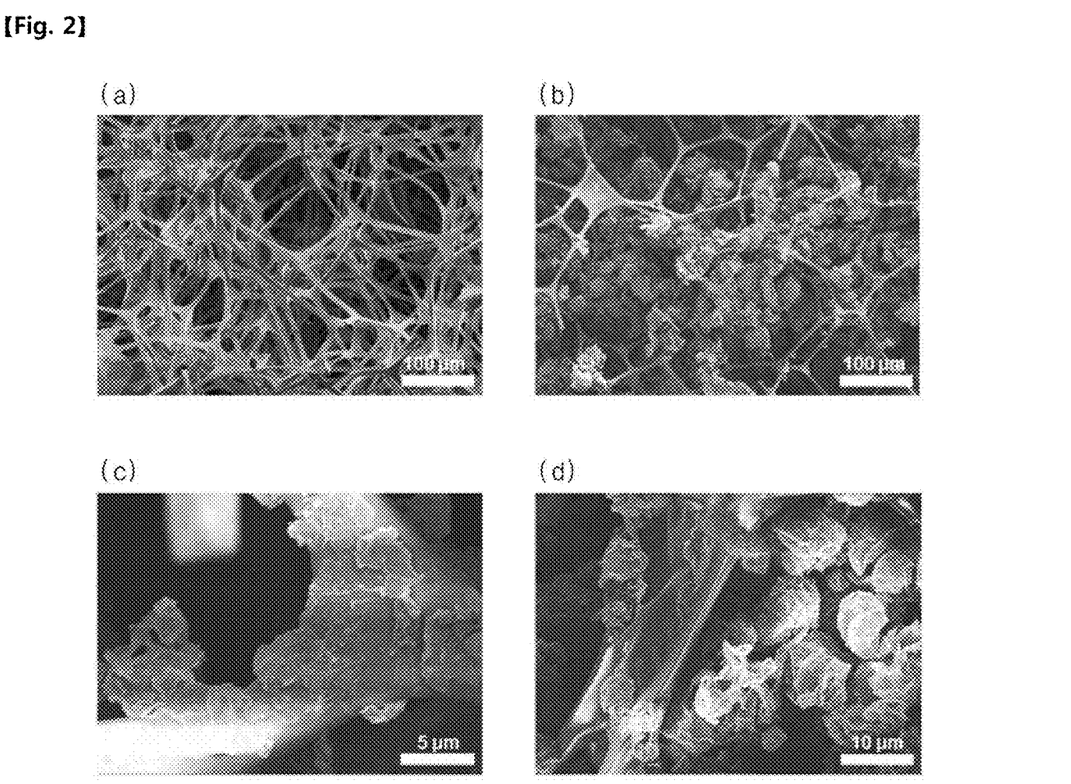
FIG. 2 shows a conductive structure manufactured according to an embodiment of the inventive concepts.

FIG. 2 shows a conductive structure manufactured according to an embodiment of the inventive concepts. In more detail, FIG. 2 shows the conductive structure manufactured by the manufacturing method described with reference to FIG. 1.

An image (a) of FIG. 2 shows an internal structure of the template in an initial state. Referring to the image (a) of FIG. 2, the template includes a plurality of the skeletons and the pores between the skeletons.

Referring to an image (b) of FIG. 2, the graphene flakes are aggregated and formed in the pores of the template as well as on the skeletons of the template. For reference, the conductive structure in the image (b) of FIG. 2 was manufactured by dip-coating polyurethane sponge with a 1 mg/ml graphene flake DMF dispersion solution.

Images (c) and (d) of FIG. 2 are high magnification images of the image (b) of FIG. 2. Referring to the images (c) and (d) of FIG. 2, the graphene flake particles are aggregated and formed in the pore of the template.

Figure 3:
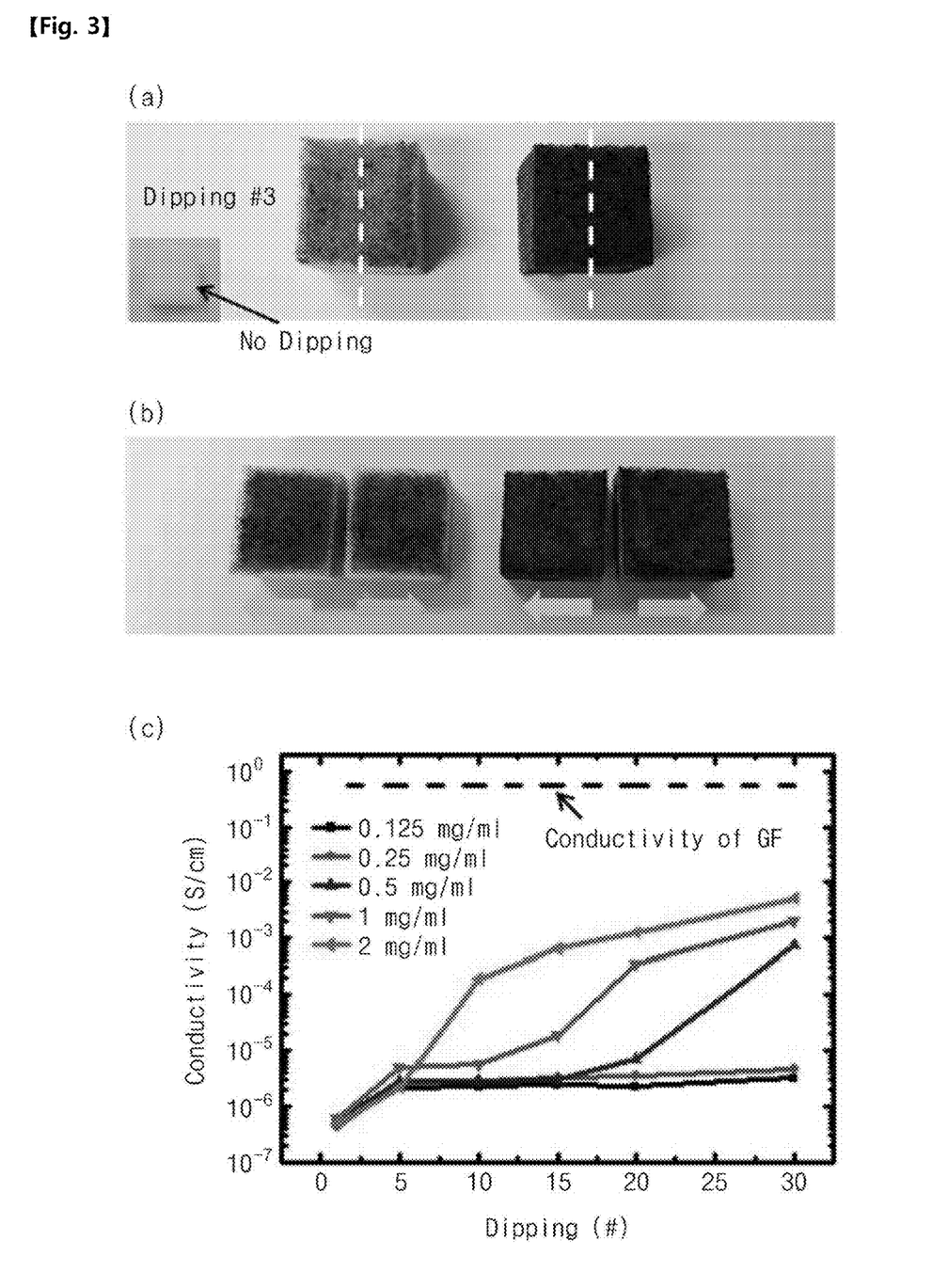
FIG. 3 shows characteristics of a conductive structure manufactured according to an embodiment of the inventive concepts.

FIG. 3 shows characteristics of a conductive structure manufactured according to an embodiment of the inventive concepts.

A left conductive structure of an image (a) of FIG. 3 is a sample dip-coated 3 times with a dispersion solution of 1 mg/ml (graphene flake/DMF dispersion solution), and a right conductive structure of the image (a) of FIG. 3 is a sample dip-coated 30 times with the dispersion solution of 1 mg/ml (graphene flake/DMF dispersion solution). As shown in the image (a) of FIG. 3, it may be recognized that an initial white color of the template is changed into a black color of the graphene flakes as the number of the dip-coating processes increases.

An image (b) of FIG. 3 is an image obtained after cutting the conductive structures of the image (a) of FIG. 3. As shown in the image (b) of FIG. 3, it may be recognized that the color of the template is changed into the black color since the graphene flakes permeate into the inside of the template.

A graph (c) of FIG. 3 shows a change in conductivity of the conductive structure according to a concentration of the graphene flakes in the dispersion solution. Referring to the graph (c) of FIG. 3, it may be recognized that the conductivity is improved as the concentration of the graphene flakes increases.

The experimental results of the conductive structure manufactured according to the embodiment of the inventive concepts were described above with reference to FIGS. 2 and 3. Hereinafter, a method of manufacturing a touch sensor including the conductive structure described above and a touch sensor manufactured thereby will be described with reference to FIGS. 4 to 7.

Figure 4:
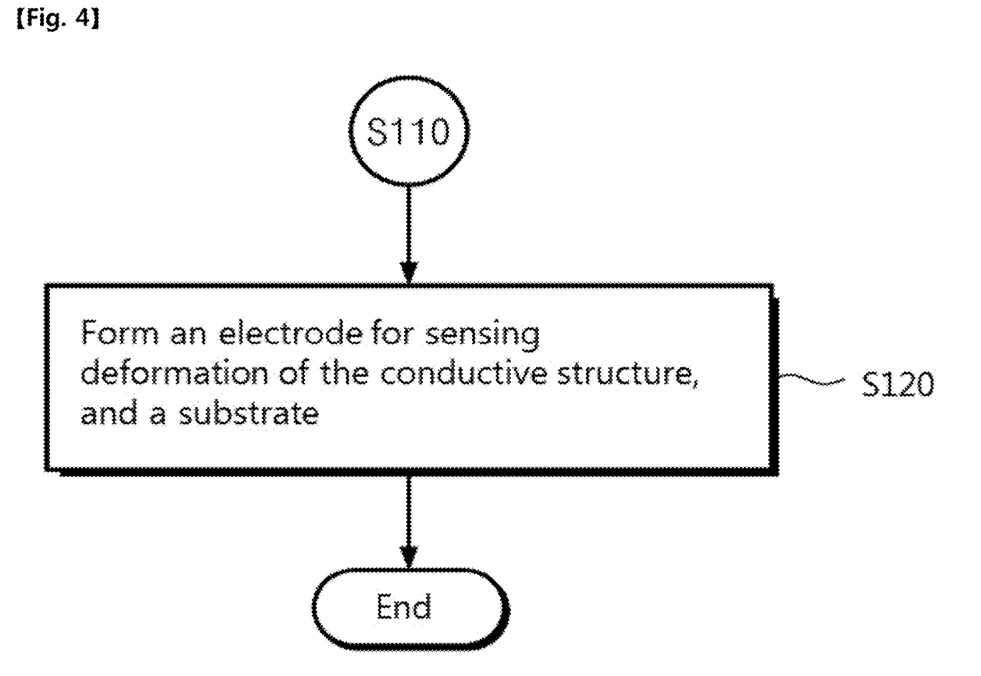
FIG. 4 is a flowchart illustrating a method of manufacturing a touch sensor including a conductive structure according to an embodiment of the inventive concepts.
Figure 5:
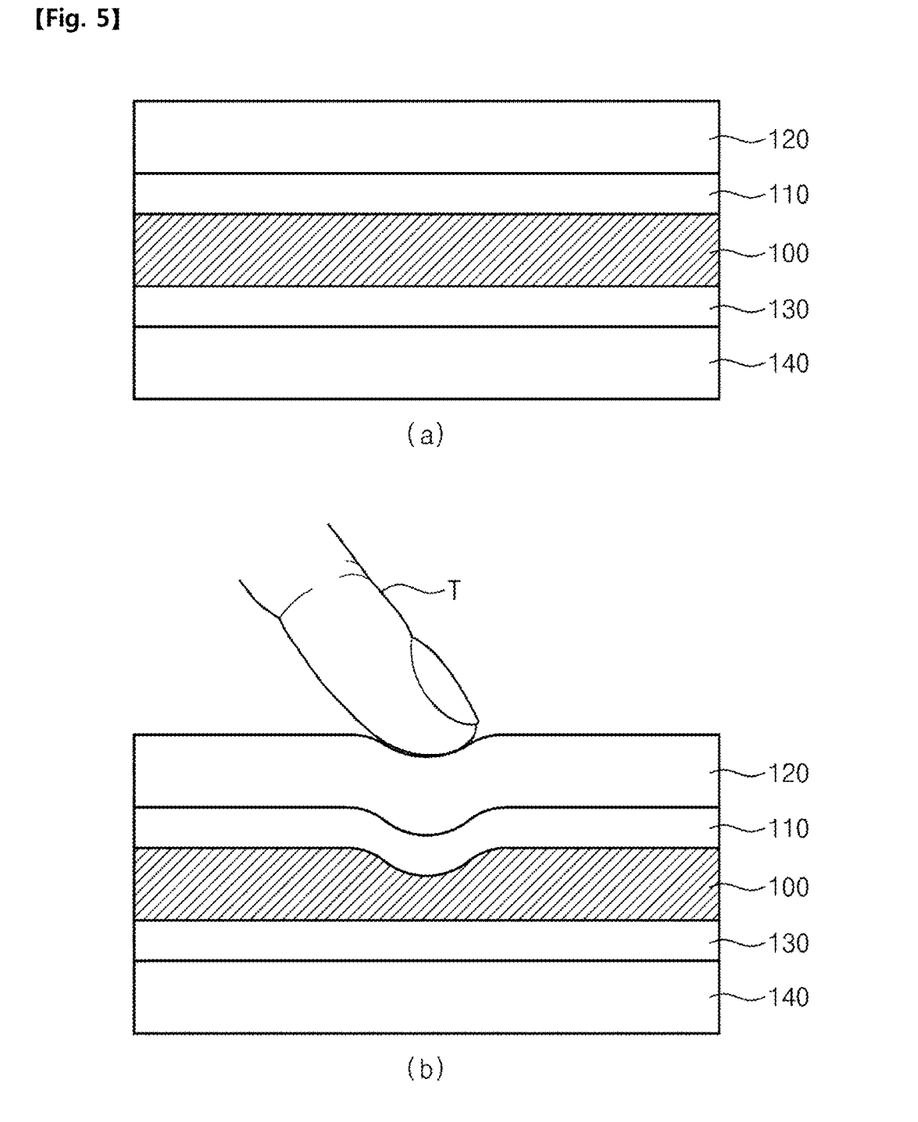
FIG. 5 illustrates a touch sensor including a conductive structure according to an embodiment of the inventive concepts.

FIG. 4 is a flowchart illustrating a method of manufacturing a touch sensor including a conductive structure according to an embodiment of the inventive concepts, and FIG. 5 illustrates a touch sensor including a conductive structure according to an embodiment of the inventive concepts.

Referring to FIG. 4, after the operation S110 illustrated in FIG. 1, an operation S120 of forming an electrode for sensing deformation of the conductive structure, and a substrate may be further performed to manufacture a touch sensor including the conductive structure according to an embodiment of the inventive concepts.

In more detail, the electrode may be formed on at least one of a top surface or a bottom surface of the conductive structure. The electrode may be a component for measuring the conductivity of the conductive structure which is changed when the conductive structure is deformed by touch of an object. To achieve this, the electrode may be formed of at least one of various conductive materials such as Pt, Cr, Au, and ITO. Hereinafter, the electrode formed of Pt will be described as an example for the purpose of ease and convenience in explanation.

In some embodiments, the electrode may be formed on each of the top surface and the bottom surface of the conductive structure or may be selectively formed on only one of the top surface and the bottom surface of the conductive structure.

The substrate may be formed on the electrode. The substrate may be formed of a flexible material capable of protecting the electrode and the conductive structure from the outside and of being deformed by touch of an object. For example, the substrate may be formed of polyethylene terephthalate (PET) or polyethylenenaphthalate (PEN). Hereinafter, the substrate formed of PET will be described as an example for the purpose of ease and convenience in explanation.

In some embodiments, the electrode and the substrate may be formed, and then, the conductive structure may be formed. In this case, the electrode may be formed on one surface of the substrate by a coating method, and then, the conductive structure may be formed. Alternatively, the electrode may be formed on the conductive structure, and then, the substrate may be formed.

In some embodiments, the electrode may be formed to cover one surface of the conductive structure or may be formed on only a specific region of the one surface of the conductive structure. When the electrode covers the one surface of the conductive structure, the electrode may also have flexibility such that the conductive structure is deformed according to touch of an object.

A view (a) of FIG. 5 illustrates an example of the touch sensor including the conductive structure, described with reference to FIG. 4. As illustrated in the view (a) of FIG. 5, the touch sensor including the conductive structure according to an embodiment of the inventive concepts may include the conductive structure 100, a first electrode 110 formed on a top surface of the conductive structure 100, and a first substrate 120 formed on a top surface of the first electrode 110 and may further include a second electrode 130 formed on a bottom surface of the conductive structure 100 and a second substrate 140 formed on a bottom surface of the second electrode 130.

Even though not shown in the drawings, in certain embodiments, the electrode may be provided on only one surface of the conductive structure as described above. Alternatively, the electrode may be formed on only a specific region of the one surface of the conductive structure.

A view (b) of FIG. 5 illustrates deformation of the touch sensor by touch of an object T. As illustrated in the view (b) of FIG. 5, when the object T touches the touch sensor, deformation of the substrate, the electrode and the conductive structure may be caused. Thus, a degree of a surface contact of the graphene flakes included in the conductive structure may be changed to cause a change in conductivity of the conductive structure. The change in conductivity of the conductive structure may be measured through the electrode. Meanwhile, when the touch of the object T is removed, the shapes of the conductive structure, the electrode and the substrate may be restored by the restoring force of the template. At this time, the graphene flakes formed in the pore of the conductive structure may provide additional restoring force.

The method of manufacturing the touch sensor including the conductive structure and the touch sensor manufactured thereby according to embodiments of the inventive concepts were described above with reference to FIGS. 4 and 5. Hereinafter, performance characteristics of the touch sensor including the conductive structure according to the embodiment of the inventive concepts will be described with reference to FIGS. 6 and 7.

Figure 6:
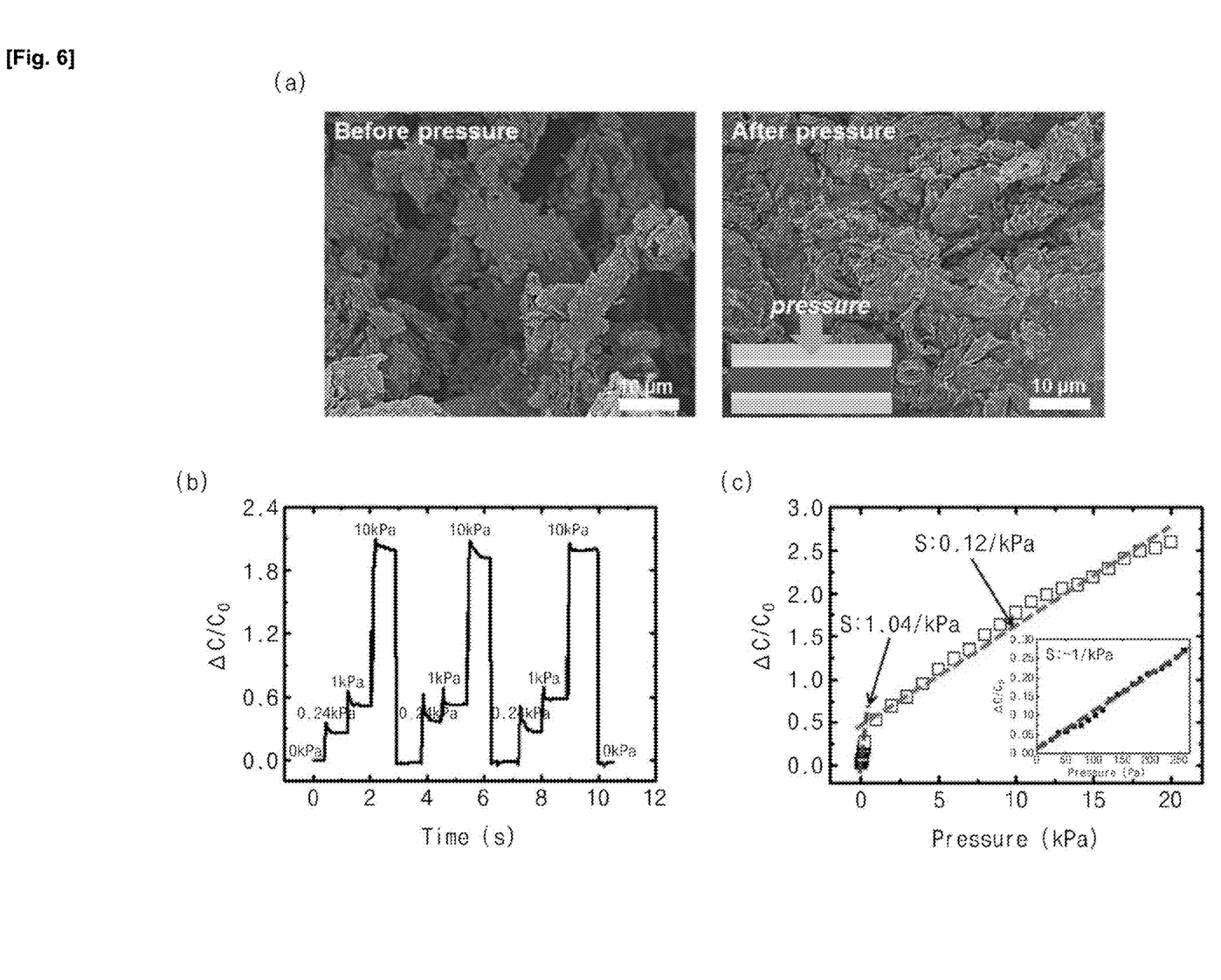
FIGS. 6 and 7 show performance characteristics of a touch sensor including a conductive structure according to an embodiment of the inventive concepts.
Figure 7:
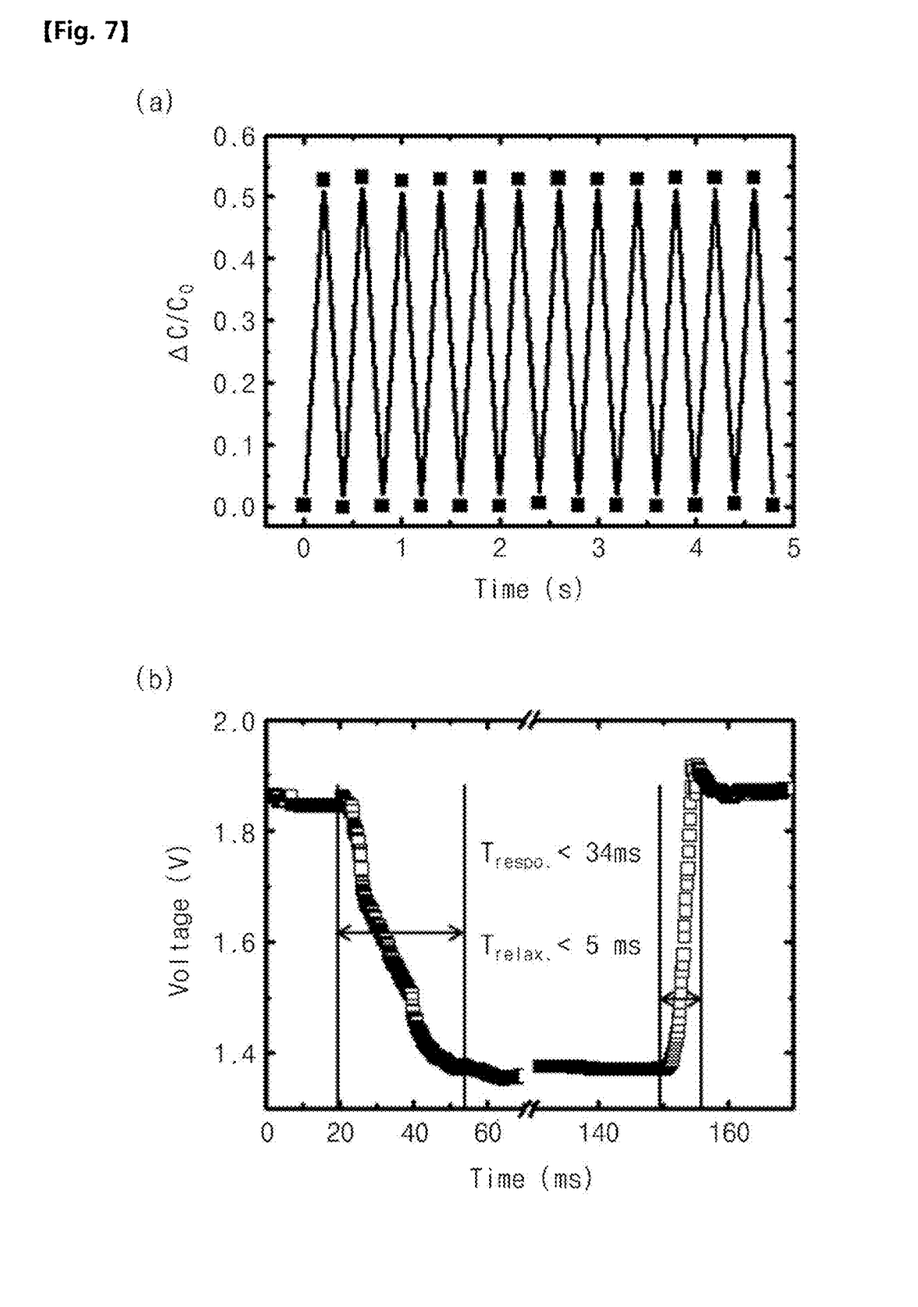

FIGS. 6 and 7 show performance characteristics of a touch sensor including a conductive structure according to an embodiment of the inventive concepts.

Images (a) of FIG. 6 show the conductive structure before touch of an object (a left image in (a) of FIG. 6) and the conductive structure in a state of touch of the object (a right image in (a) of FIG. 6). As shown in the images (a) of FIG. 6, the graphene flakes are spaced apart from each other before the touch of the object. When the touch of the object occurs, the conductive structure is thinned, and thus the graphene flakes therein come in contact with each other. As a result, a conductive path may be generated through the graphene flakes by the touch of the object.

A graph (b) of FIG. 6 shows a change in conductivity of the touch sensor according to a static pressure. As shown in the graph (b) of FIG. 6, since static pressures of 0.24 kPa, 1 kPa and 10 kPa are applied, the conductivity is changed. An increase in static pressure by the touch may increase a contact area between the graphene flakes, and thus the conductivity may be increased.

A graph (c) of FIG. 6 shows a sensitivity S measured from the change in conductivity by the static pressure. As shown in the graph (c) of FIG. 6, it may be recognized that excellent sensitivity is provided in a wide pressure range having a size of about 20,000 Pa.

A graph (a) of FIG. 7 shows a change in conductivity when a dynamic pressure of 60 kPa to 640 kPa is applied. When the dynamic pressure of 60 kPa to 640 kPa is applied at an interval of 0.2 seconds by touch, the touch sensor according to the embodiment of the inventive concepts provides the change in conductivity of high reliability.

A graph (b) of FIG. 7 shows experimental results of a time for which the conductive structure reaches a normal state when a pressure of 500 Pa is applied. As shown in the graph (b) of FIG. 7, when the touch pressure of 500 Pa is applied, deformation of the conductive structure is completed after 34 ms. In addition, when the touch pressure of 500 Pa is removed, restoration of the conductive structure is completed in 5 ms. This may be because the template and the graphene flakes of the conductive structure provide excellent restoring characteristics.

The method of manufacturing the touch sensor including the conductive structure and the touch sensor manufactured thereby according to embodiments of the inventive concepts were described above with reference to FIGS. 4 to 7. The touch sensor manufactured according to the embodiments of the inventive concepts may provide the high sensitivity and the high restoring force by the graphene flakes aggregated and formed in the template.

Hereinafter, a method of manufacturing a touch sensor for sensing a surface roughness and a touch sensor manufactured thereby will be described with reference to FIGS. 8 to 10. The embodiments of the inventive concepts described above with reference to FIGS. 1 to 7 may be applied to the present embodiment.

Figure 8:
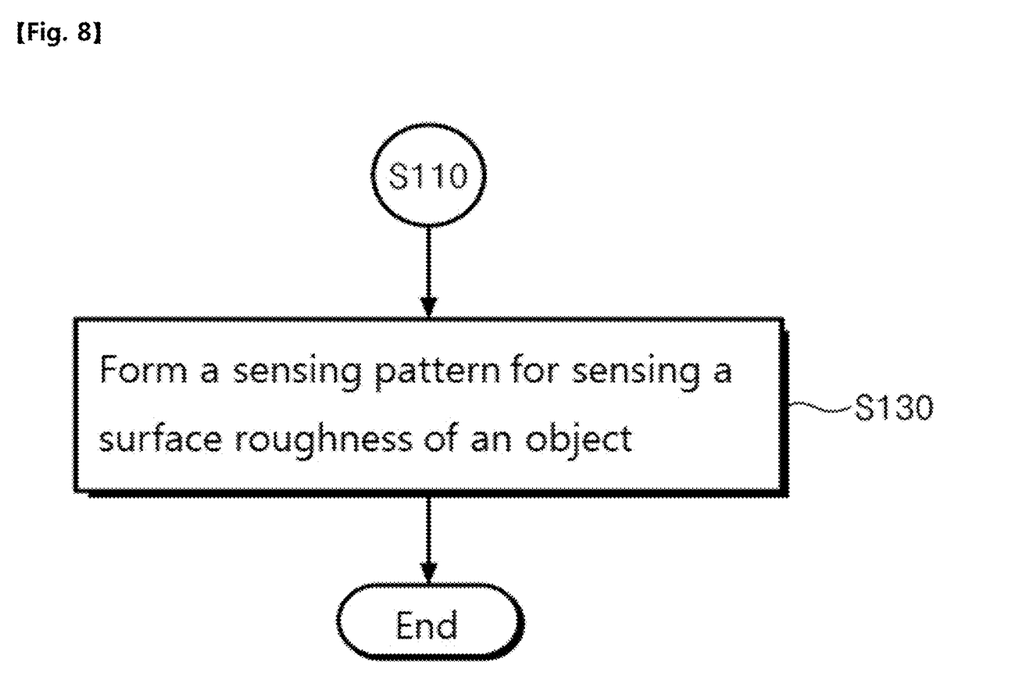
FIG. 8 is a flowchart illustrating a method of manufacturing a touch sensor capable of sensing a surface roughness of a touch object, according to an embodiment of the inventive concepts.
Figure 9:
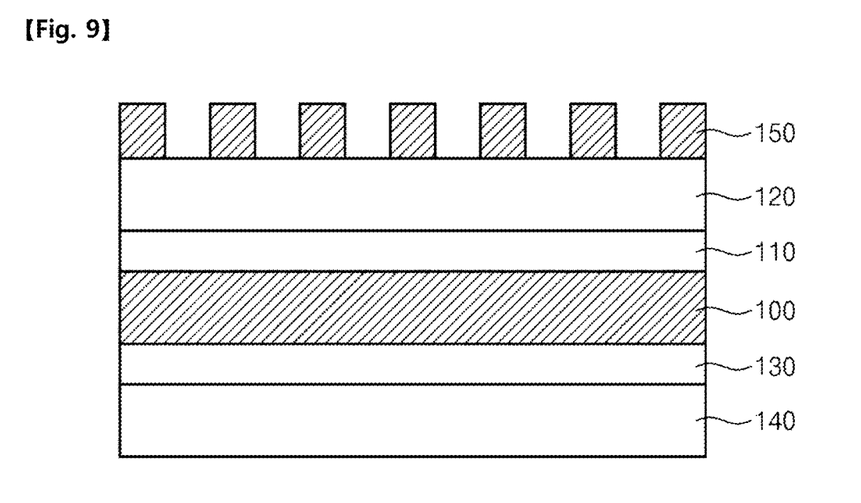
FIG. 9 is a view illustrating a touch sensor capable of sensing a surface roughness of a touch object, according to an embodiment of the inventive concepts.

FIG. 8 is a flowchart illustrating a method of manufacturing a touch sensor capable of sensing a surface roughness of a touch object, according to an embodiment of the inventive concepts, and FIG. 9 is a view illustrating a touch sensor capable of sensing a surface roughness of a touch object, according to an embodiment of the inventive concepts.

Referring to FIG. 8, after the operation S120 illustrated in FIG. 4, an operation S130 of forming a sensing pattern for sensing a surface roughness of an object may be performed to manufacture a touch sensor for sensing a surface roughness of a touch object according to an embodiment of the inventive concepts.

The sensing pattern may be a component for measuring the surface roughness of the touch object and may be included in, for example, a sensing substrate. For example, the sensing substrate may be formed of polyethylene terephthalate (PET) or polyethylenenaphthalate (PEN).

In some embodiments, the sensing substrate may be formed of the same material as the first substrate. For example, the sensing substrate may be formed of PET. In an embodiment, the sensing substrate may be disposed on the first substrate.

The sensing pattern may be formed by at least one of various methods.

For example, a sensing layer may be formed on the first substrate 120 providing a touch surface, and a photoresist (e.g., SU-8) may be formed on the sensing layer. Thereafter, an exposure process for forming the sensing pattern from the sensing layer may be performed. Next, an etching process may be performed to remove an unnecessary portion of the sensing layer. Thus, the sensing pattern 150 may be formed on the first substrate 120 as illustrated in FIG. 9.

Alternatively, the sensing pattern 150 may be integrally formed with the first substrate 120 as a single unitary body. For example, the first substrate 120 including the sensing pattern may be formed by patterning a portion of the first substrate 120. In this case, the sensing pattern may be formed by a simpler method to provide convenience in manufacture.

The sensing pattern 150 may include a plurality of lines extending in one direction. The plurality of lines may be spaced apart from each other and may be arranged at equal intervals. Widths of the plurality of lines may be substantially equal to each other. Heights of the plurality of lines may be substantially equal to each other.

The method of manufacturing the touch sensor for sensing the surface roughness of the touch object and the touch sensor manufactured thereby according to embodiments of the inventive concepts were described above with reference to FIGS. 8 and 9. Hereinafter, sensing performance of the touch sensor for sensing the surface roughness of the touch object according to the embodiment of the inventive concepts will be described with reference to FIG. 10.

Figure 10:
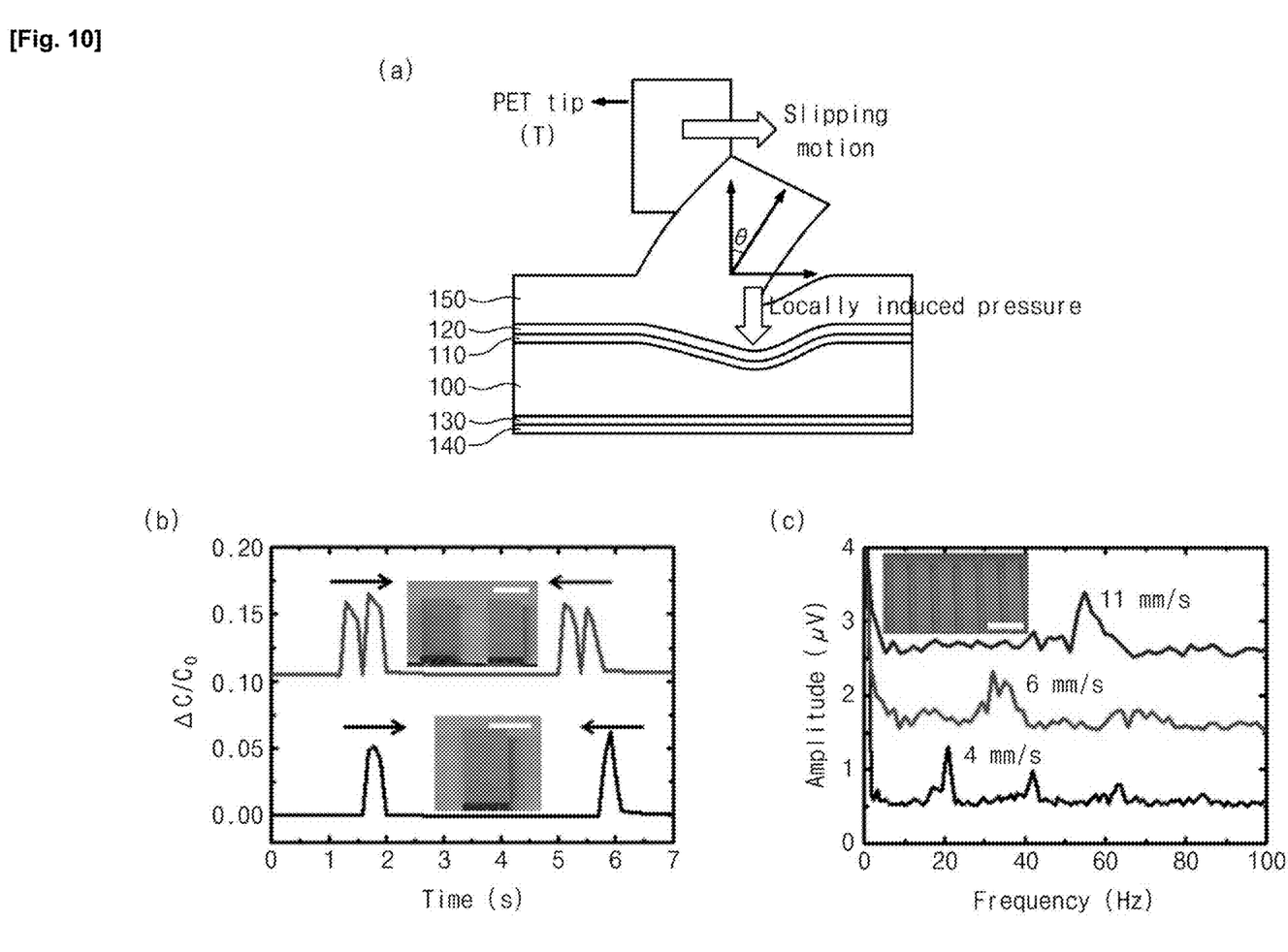
FIG. 10 shows performance characteristics of a touch sensor capable of sensing a surface roughness of a touch object, according to an embodiment of the inventive concepts.

FIG. 10 shows performance characteristics of a touch sensor capable of sensing a surface roughness of a touch object, according to an embodiment of the inventive concepts.

A view (a) of FIG. 10 is a conceptual view of the touch sensor for sensing the surface roughness of the touch object, according to the embodiment of the inventive concepts. As illustrated in the view (a) of FIG. 10, when an object having a surface roughness touches the touch sensor, deformation of the sensing pattern 150 may occur, and deformation of the conductive structure may be caused by the deformation of the sensing pattern 150. Thus, the surface roughness may be converted into an electrical signal.

A graph (b) of FIG. 10 shows a change in conductivity of the conductive structure by touch of a touch object (top) having two protrusions on a surface thereof and a change in conductivity of the conductive structure by touch of a touch object (bottom) having one protrusion on a surface thereof. Referring to the graph (b) of FIG. 10, it may be recognized that different conductivity peaks occur depending on the surface roughness of the touch object. Thus, the surface roughness may be sensed.

A graph (c) of FIG. 10 shows experimental results obtained by converting response characteristics according to touch of a touch object having periodic patterns on a surface thereof into frequencies. Referring to the graph (c) of FIG. 10, it may be recognized that corresponding peaks occur according to a surface movement speed of the touch object (in a slipping motion direction in the view (a) of FIG. 10).

According to the method of manufacturing the touch sensor and the touch sensor manufactured thereby according to the embodiments of the inventive concepts described with reference to FIGS. 8 to 10, the effect of sensing the surface roughness of the touch object may be realized by the simple component which is the sensing pattern.

Some embodiments of the inventive concepts may provide the conductive structure which includes the template including the skeleton and the pore therein and having flexibility, and the conductive material aggregated and formed on the skeleton and in the pore. Here, the conductive material may be formed of, for example, the graphene flakes.

In addition, some embodiments of the inventive concepts may provide the method of manufacturing a conductive structure, which includes providing the template which has the skeleton and the pore therein and has flexibility, and immersing the template in the conductive material dispersion solution to aggregate and form the conductive material on the skeleton and in the pore. Here, the conductive material may be formed of, for example, the graphene flakes.

According to the embodiments of the inventive concepts, the graphene flakes may be formed in the pore as well as on the skeleton of the template by the aggregating force of the graphene flakes, and thus the high conductivity may be provided and the touch restoring force may be provided by the flexibility of the template.

In other words, according to the embodiments of the inventive concepts, the conductive structure and the touch sensor including the conductive structure may be manufactured by the simpler method, and the manufacturing methods thereof and the touch sensing method may also be provided.

While the inventive concepts have been described with reference to exemplary embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A touch sensor comprising:
    a conductive structure comprising: a flexible template having a plurality of skeletons in a depth direction and pores formed between the individual skeletons therein; and a conductive material aggregated and formed on the plurality of skeletons and in the pores, the conductive structure configured to be deformed by touch of an object;
    a first substrate;
    a first electrode provided between the first substrate and the conductive structure;
    a second substrate provided on a surface of the conductive structure opposite to the first substrate; and
    a second electrode provided between the second substrate and the conductive structure,
    wherein the conductive material is formed of a number of graphene flakes,
    wherein a conductive path is generated inside the conductive structure through the graphene flakes that are brought in contact with each other by the touch of the object, and
    wherein the template is formed of sponge.

2. The touch sensor of claim 1, wherein when the object is touched through the first substrate, a conductivity of the conductive structure increases.

3. The touch sensor of claim 2, wherein the conductivity of the conductive structure is sensed through the first electrode.

4. A touch sensing method comprising:
    touching an object to the touch sensor comprising the conductive structure of claim 3 to deform the conductive structure; and
    sensing a change in conductivity according to the deformation of the conductive structure to sense touch or a surface roughness of the object.

5. The touch sensor of claim 2, wherein when the touch of the object is removed, the deformation of the conductive structure is restored by flexibility of the conductive structure.

6. A touch sensing method comprising:
    touching an object to the touch sensor comprising the conductive structure of claim 5 to deform the conductive structure; and
    sensing a change in conductivity according to the deformation of the conductive structure to sense touch or a surface roughness of the object.

7. A touch sensing method comprising:
    touching an object to the touch sensor comprising the conductive structure of claim 2 to deform the conductive structure; and
    sensing a change in conductivity according to the deformation of the conductive structure to sense touch or a surface roughness of the object.

8. The touch sensor of claim 1, wherein the conductive structure is deformed by the touch of the object in such a way that a thickness of the conductive structure is reduced.

9. A touch sensing method comprising:
    touching an object to the touch sensor comprising the conductive structure of claim 8 to deform the conductive structure; and
    sensing a change in conductivity according to the deformation of the conductive structure to sense touch or a surface roughness of the object.

10. The touch sensor of claim 1, further comprising:
    a sensing substrate on a surface of the first substrate, to which the object is touched, wherein the sensing substrate includes a sensing pattern.

11. A touch sensing method comprising:
    touching an object to the touch sensor comprising the conductive structure of claim 10 to deform the conductive structure; and
    sensing a change in conductivity according to the deformation of the conductive structure to sense touch or a surface roughness of the object.

12. A touch sensing method comprising:
    touching an object to the touch sensor comprising the conductive structure of claim 1 to deform the conductive structure; and
    sensing a change in conductivity according to the deformation of the conductive structure to sense touch or a surface roughness of the object.

13. A method of manufacturing a touch sensor, the method comprising:
    immersing a template, which has flexibility and comprises a plurality of skeletons in a depth direction and pores formed between the individual skeletons therein, in a conductive material dispersion solution to aggregate a conductive material on the plurality of skeletons and in the pores, thereby forming a conductive structure; and
    forming a first electrode, which is configured to sense deformation of the conductive structure by touch of an object, on a top surface of the conductive structure, and forming a second electrode on a bottom surface of the conductive structure, wherein the conductive material is formed of a number of graphene flakes, wherein a conductive path is generated inside the conductive structure through the graphene flakes that are brought in contact with each other by the touch of the object, and wherein the template is formed of sponge.

14. The method of claim 13, further comprising:

forming a sensing pattern for sensing a surface roughness of the object on the top surface of the conductive structure.

* * * * *